UNITED STATES PATENT OFFICE.

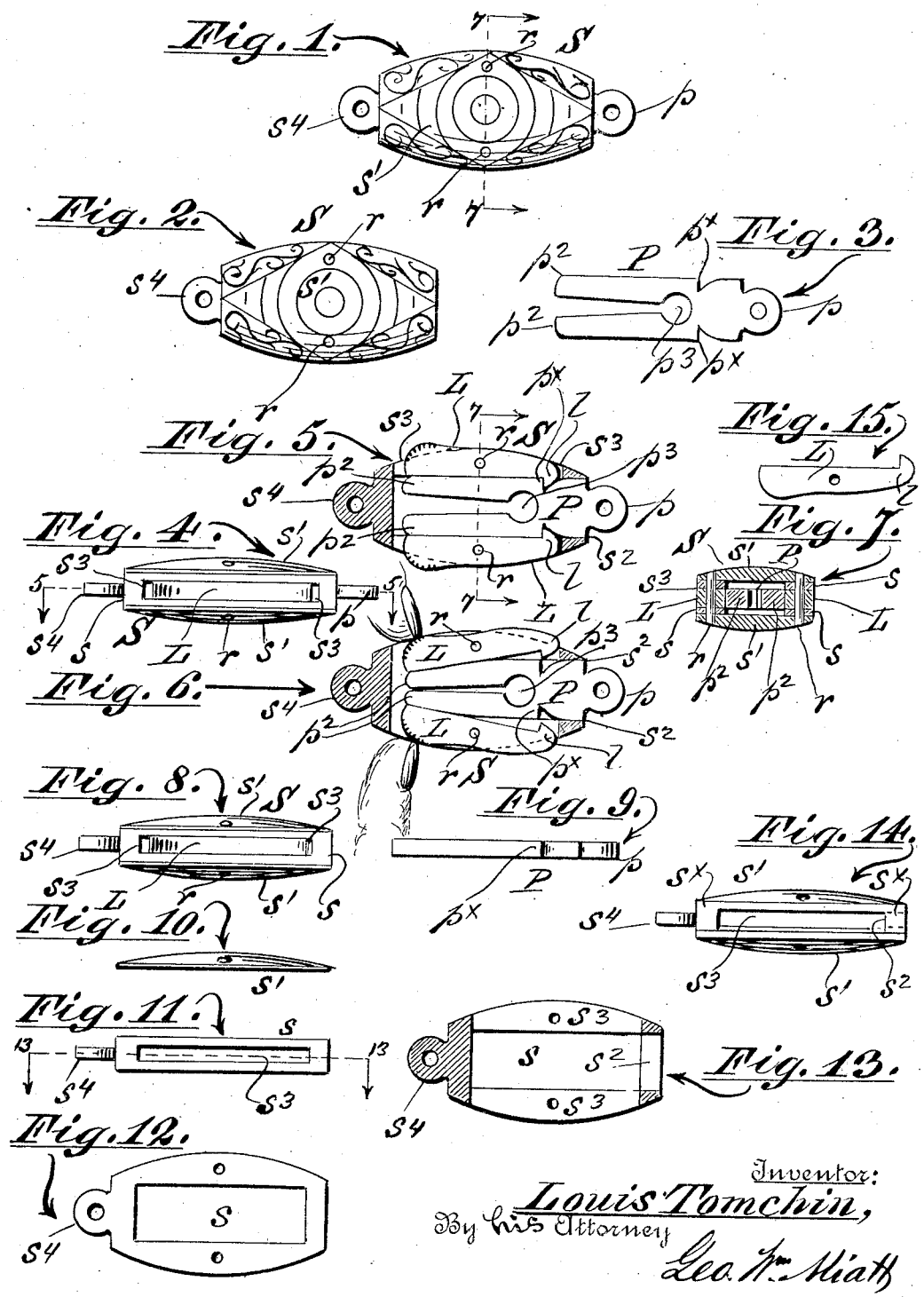

LOUIS TOMCHIN, OF BROOKLYN, NEW YORK.

CLASP FOR JEWELRY, &c.

1,361,645.     Specification of Letters Patent.     Patented Dec. 7, 1920.

Application filed July 31, 1920. Serial No. 400,390.

*To all whom it may concern:*

Be it known that I, LOUIS TOMCHIN, a citizen of the United States, and a resident of the borough of Brooklyn, county of Kings, city and State of New York, have invented certain new and useful Improvements in Clasps for Jewelry, &c., of which the following is a specification.

While adaptable for use as a coupling device generally, my clasp is designed more especially for jewelry, and particularly for necklaces, etc., where a positive but detachable connection is desirable between the ends of a flexible strip, cord, band, or the like. My improvements are designed to afford absolute security against accidental uncoupling, and this I accomplish by the provision of duplex locking means as hereinafter set forth,—the invention consisting in the specific construction, and arrangement of parts described and claimed, and a distinctive feature being the combination of a shouldered coupling pin formed with a bifurcated elastic resilient insert, and a socket member for the reception thereof, formed with two rockable latches adapted to engage automatically with said shouldered coupling pin, which latter can then be released only by the simultaneous retraction of both latches against the resistance of the said bifurcated portion of the coupling pin; a result attainable only by intentional manipulation. In other words, the rocking of one latch will not release the coupling pin, and the possibility of the accidental coincidental rocking of both latches is so remote a contingency as to be practically negligible.

Hence my improved clasp is exceptionally valuable as a means for effectually securing together the ends of necklaces of diamonds, pearls, and other precious stones, and of other articles of jewelry; although also adapted, as before intimated, to various analogous uses and purposes.

In the accompanying drawings,

Figure 1, is a side elevation of my improved clasp, closed;

Fig. 2, is a side elevation of the socket member;

Fig. 3, is a side view of the insert member or coupling pin;

Fig. 4, is an edge view of the device closed, as in Fig. 1;

Fig. 5, is a section thereof taken upon plane of line 5—5, Fig. 4;

Fig. 6, is a like view, showing the rock lever catches retracted;

Fig. 7, is a transverse section taken upon plane of line 7—7, Figs. 1 and 5;

Fig. 8, is an edge view of the socket member;

Fig. 9, is an edge view of the coupling pin;

Fig. 10, is an edge view of a side or cheek plate;

Fig. 11, is an edge view of the medial portion of frame of the socket member;

Fig. 12, is a side view thereof;

Fig. 13, is a section taken upon plane of line 13—13, Fig. 11;

Fig. 14, is an edge view of the socket member showing a modification in the construction thereof.

Fig. 15, is a side view of one of the rockable latches.

As shown in all but Fig. 14, of the drawings, the socket member S, consists of a medial spacing frame $s$, interposed between side or cheek plates $s'$, $s'$, and formed with an end opening $s^2$, for the insertion of the flat coupling member or pin P, and with side slots $s^3$, $s^3$, for the accommodation of the rocker-latches L, L. In the modification shown in Fig. 14, the side plates $s'$, $s'$, are spaced apart by abutments $s^x$, $s^x$, formed directly on one side plate and bearing against the other, with the end opening $s^2$, and side slots $s^3$, therebetween—both constructions of socket functioning in like manner in that they provide for the mounting of the rocker latches L, L, and for the reception of the coupling pin P, between the cheek plates $s'$, $s'$.

The socket member S, is formed with the usual loop $s^4$, for connection with a chain, cord, or other flexible attachment; and in like manner, and for like purpose, the coupling pin P, is formed with the loop $p$.

It will be seen by reference to Figs. 5, 6 and 7, particularly that the rockable latches L, L, are fulcrumed medially on the rivets $r$, $r$, by which the cheek plates $s'$, $s'$, are secured to the spacing frame $s$, and that they are positioned mainly within the longitudinal slots $s^3$, $s^3$, of the socket member S. Their forward ends are formed with catch hooks $l$, $l$, for engagement with the lock shoulders $p^+$, $p^+$, on the shank of the coupling pin P, as shown in Fig. 5, in which position their rear ends protrude slightly beyond the edges of the socket S, so as to be accessible to the fingers, as indicated in Fig. 6, for the purpose of effecting the release of the coupling pin P, by rocking the latches L, L, sufficiently to disengage the aforesaid catch hooks $l, l$, from the lock shoulders $p^+, p^+$, of the coupling pin P, against the resistance of the prongs $p^2, p^2$, forming the bifurcated end of the latter.

The coupling pin P, consists preferably of a flat plate formed with a recess $p^3$, at and between the basic ends of the prongs $p^2, p^2$, so as to increase the elasticity thereof. The free ends of said prongs $p^2, p^2$, are chamfered or rounded off to facilitate their insertion between the latches L, L. Thus, upon the insertion of the coupling pin P, into the socket S, the bifurcated end of the said pin will first rock the latches until the hooks $l, l$, coincide with the pin shoulders $p'$, and then rock the latches into engagement as shown in Fig. 5,—the resilience of the prongs $p^2, p^2$, rendering such engagement positive until disconnection is effected manually as hereinbefore set forth.

It will be seen that my improved clasp is of simple construction and operation, and that the component parts thereof may be die-formed and thus standardized, reducing the cost of production to the minimum.

It is also obvious that a distinctive characteristic of my improved clasp is the fact that the primary locking means, the rockable latches L, L, are themselves locked in positive engagement with the coupling pin P, by the elasticity and resilience of the bifurcated end of the latter; and that hence said coupling pin is double-locked in position within the socket member, and can only be released therefrom by the simultaneous retractile rocking of both of said latches against the resistance of the elastic resilient prongs of the coupling pin as set forth, so that the danger of accidental uncoupling is practically eliminated.

My construction of clasp is not only more secure than those heretofore in use in the art, but it is also stronger and more permanent—the strain of use being distributed to and sustained by the two hooks $l, l$, of rigid structure, which are furthermore reinforced laterally by the side walls of the slots $s^3, s^6$, so that the bending or fracture of said hooks is practically impossible under ordinary conditions of use.

What I claim as my invention and desire to secure by Letters Patent is,

In a duplex clasp of the character designated, the combination of a socket piece, rockable latch levers fulcrumed therein, and a bifurcated elastic resilient coupling pin formed with shoulders for engagement with said latch levers, for the purpose set forth.

LOUIS TOMCHIN.

Witnesses:
  GEO. WM. MIATT,
  DOROTHY MIATT.